(12) United States Patent
Hofmann (10) Patent No.: US 8,562,881 B2
(45) Date of Patent: Oct. 22, 2013

(54) FIBRE COMPOSITE PROFILE COMPONENT AND PROCESS AND APPARATUS FOR CONTINUOUS PRODUCTION

(75) Inventor: Peter Hofmann, Gauting (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/634,353

(22) PCT Filed: Mar. 11, 2011

(86) PCT No.: PCT/EP2011/053672
§ 371 (c)(1),
(2), (4) Date: Nov. 2, 2012

(87) PCT Pub. No.: WO2011/113755
PCT Pub. Date: Sep. 22, 2011

(65) Prior Publication Data
US 2013/0142997 A1    Jun. 6, 2013

(30) Foreign Application Priority Data

Mar. 17, 2010 (DE) .......................... 10 2010 002 988

(51) Int. Cl.
*B29C 70/50* (2006.01)
(52) U.S. Cl.
USPC .......................................... 264/136; 264/258
(58) Field of Classification Search
USPC .............................. 264/136, 167, 177.25, 258
See application file for complete search history.

(56) References Cited

U.S. PATENT DOCUMENTS

| 3,178,922 | A | * | 4/1965 | Tabor | 72/152 |
| 3,223,027 | A | * | 12/1965 | Soda et al. | 100/310 |
| 3,795,470 | A | * | 3/1974 | De Mets | 425/371 |
| 3,815,203 | A | * | 6/1974 | Schulenberg et al. | 29/726 |

(Continued)

FOREIGN PATENT DOCUMENTS

| DE | 31 39 222 A1 | 3/1983 |
| DE | 40 02 214 A1 | 8/1991 |

(Continued)

OTHER PUBLICATIONS

German Office Action Corresponding to DE 10 2010 002 988.2.

(Continued)

*Primary Examiner* — Matthew Daniels
(74) *Attorney, Agent, or Firm* — Davis & Bujold, PLLC; Michael J. Bujold (57) ABSTRACT

A process for continuous production of profile components of fiber composite material by a forming chain system, an associated profile component and the chain system for its continuous production. The method draws on the forming chain system having at least one forming chain. Here, preform batch of fiber strands, impregnated with matrix material and/or woven fiber webs, knit webs or nonwoven webs, are brought to the system at the working run of the at least one forming chain and are guided through the forming chain system, forming a continuous profile containing the profile component with a variable cross section over the profile length and/or with a profile longitudinal axis with virtually any desired extent. The profile components can be provided with local reinforcements, add-on parts of inserts, for example, for introducing force, as early as during primary forming.

20 Claims, 3 Drawing Sheets

(56) References Cited

U.S. PATENT DOCUMENTS

| | | | |
|---|---|---|---|
| 3,985,225 A * | 10/1976 | Baum et al. | 198/834 |
| 4,123,246 A * | 10/1978 | Johnson | 65/104 |
| 4,151,031 A * | 4/1979 | Goad et al. | 156/201 |
| 4,420,359 A * | 12/1983 | Goldsworthy | 156/379.8 |
| 4,556,406 A * | 12/1985 | Kahle | 65/106 |
| 4,573,404 A * | 3/1986 | Held | 100/151 |
| 4,670,080 A * | 6/1987 | Schwarz et al. | 156/307.5 |
| 5,057,175 A * | 10/1991 | Ashton | 156/202 |
| 5,141,583 A * | 8/1992 | Held | 156/324 |
| 5,330,595 A * | 7/1994 | Held | 156/64 |
| 5,407,516 A * | 4/1995 | Kaufmann et al. | 156/311 |
| 5,648,027 A * | 7/1997 | Tajiri et al. | 264/43 |
| 5,876,534 A * | 3/1999 | Erhardt | 156/78 |
| 6,375,777 B1 * | 4/2002 | Sjolin et al. | 156/209 |
| 6,502,425 B1 * | 1/2003 | Yoshizawa | 65/106 |
| 6,908,295 B2 * | 6/2005 | Thielman et al. | 425/371 |
| 7,963,123 B2 * | 6/2011 | Leclercq et al. | 65/106 |
| 8,083,976 B2 | 12/2011 | Lengsfeld et al. | |
| 2002/0144494 A1 * | 10/2002 | Krone et al. | 56/93 |
| 2007/0175575 A1 * | 8/2007 | Rubin et al. | 156/221 |
| 2008/0099131 A1 * | 5/2008 | Umeda et al. | 156/201 |
| 2009/0078362 A1 * | 3/2009 | Wilkerson et al. | 156/201 |

FOREIGN PATENT DOCUMENTS

| | | |
|---|---|---|
| DE | 695 09 227 T2 | 11/1999 |
| DE | 601 11 398 T2 | 3/2006 |
| DE | 10 2008 041 832 A1 | 3/2010 |
| GB | 2 113 599 A | 8/1983 |

OTHER PUBLICATIONS

International Search Report Corresponding to PCT/EP2011/053672.
Written Opinion Corresponding to PCT/EP2011/053672.
International Preliminary Report on Patentability Corresponding to PCT/EP2011/053672.

* cited by examiner

FIBRE COMPOSITE PROFILE COMPONENT AND PROCESS AND APPARATUS FOR CONTINUOUS PRODUCTION

This application is a National Stage completion of PCT/EP2011/053672 filed Mar. 11, 2011, which claims priority from German patent application serial no. 10 2010 002 988.2 filed Mar. 17, 2010.

FIELD OF THE INVENTION

The invention relates to a profile component of fiber composite materials and a process and an apparatus for its continuous production.

BACKGROUND OF THE INVENTION

Profile components of fiber composite materials and process and apparatuses for their continuous production are, in principle, known from prior art. Such profile components are used in a wide variety of areas of engineering. This includes reinforcement profiles of all kinds used to build aircraft fuselages or boat hulls according to the principles of light-weight construction, for example standard design profiles such as pipes, profiled beams, and solid or flat profiles, in addition to functional profile components such as wheel control or leaf spring elements.

In particular, simple standard profiles with a straight, unchanging cross section over the profile length have been produced for a long time, usually using traditional pultrusion processes. To this end, batches of continuous reinforcing fibers are generally first impregnated with a resin matrix and then drawn through a molding die that corresponds to the profile cross section. The impregnated fiber bundle thereby takes on the form of the die profile, and is cured in this form by a heating element directly following the nozzle.

Known pultrusion systems and processes produce continuous profiles in this manner, which can be wound onto drums or cut to length after curing. Typical pultrusion products are round, flat or corner profiles that can be either hollow or made out of solid material. In pultrusion, non-unidirectional woven-fabric structures can also be incorporated to a limited extent, for example by feeding layers of fabric to the molding die together with the unidirectional reinforcing fibers.

However, pultrusion processes are principally limited to the manufacture of unidimensional, linear or straight profiles. This limitation applies as a rule with only a few exceptions, in which it is possible to produce slightly curved pultrusion profiles. However, these profiles, in turn, are subject to additional limitations in terms of the producible profile cross sections.

In any case, however, the known pultrusion processes are limited to producing profiles with a smooth, even profile surface and at the same time, with an unvarying profile cross section along the entire length of the profiles. Both profiled surfaces of any kind, and a cross-sectional form or cross-sectional area that is somewhat variable over the length of the profile generally cannot be produced using pultrusion processes. Likewise, pultrusion processes do not allow profile characteristics that vary over the length of the profile such as are generally needed to introduce force in the form of reinforced force introduction points or inserts for force application in the case of complex applications.

This means that reinforcements or inserts of this kind can, at best, be added to a finished pultrusion profile later, for which time-consuming reworking is required and which may be accompanied by a possible weakening of the fiber structure or of the fiber cohesion.

Last but not least, the quality of the finished carbon fiber composite profile that can be achieved using the known pultrusion processes is limited, among other things due to the lack of a defined pressing process when the impregnated fiber bundle passes through the molding die. In particular, the production of profile components with a high reinforcement/matrix volume ratio with concomitant minimal air entrapment and high dimensional stability, which is generally required for demanding applications, is difficult or nearly impossible to achieve using the known pultrusion methods.

Due to the described limitations of the known pultrusion methods, components that are demanding both in terms of their shape and material properties are therefore still subject to time-consuming, individual production using conventional lamination methods, possibly from prepregs, or by means of resin transfer molding or pot molding.

Since the latter methods are usually limited to comparatively small components that are not very mechanically resilient, the complex layered production of profiles and components from prepregs with subsequent pressing and curing until the finished component is obtained has, until now, been the only option for especially demanding functional or profile components. The cycle times for producing one component are accordingly long and the associated production costs are accordingly high.

A method and a device for the continuous production of stringer profiles are known from patent DE 10 2008 041 832 A1, wherein continuous fiber strands or webs are enclosed between rotary forming chains, impregnated with matrix material and cured. This process and the associated apparatus known from prior art are limited, however, to the production of straight, prismatic profiles. Neither curved profiles, nor profiles with a variable profile cross section or variable surface contour can be produced therewith, nor can profiles with local reinforcements and/or other profile characteristics that vary over the length of the profile be produced, for example locally reinforced force-application points or inserts.

SUMMARY OF THE INVENTION

Against this background, the object of the present invention is to provide a fiber composite profile component as well as an associated process and an apparatus for the production thereof, by means of which the aforementioned disadvantages of the prior art are overcome. In particular, the invention is expected to make it possible to continuously produce high-quality profile components of fiber composite materials with short cycle times and in a cost-effective way in high quantities and with reproducible high quality. In so doing, nearly all of the limitations of the pultrusion methods known from the prior art will be concomitantly overcome in such a way that even profiles with a cross section that varies over the length and profiles with a profile axis that is uniformly curved, or that extends in a manner otherwise deviating from the straight from, can be produced. Last but not least, the object of the invention is to be able to provide local reinforcements, thickenings, attachments or inserts to profiles produced in this manner immediately during the primary forming, in particular for force application. In this way, the need for rework or subsequent mounting on the produced profile, in particular of force-application elements, is eliminated as completely as possible.

The method according to the invention is used for the continuous production of profile components of fiber composite material by means of a forming chain system, likewise according to the invention, wherein the fiber composite material comprises a matrix material and an arrangement of reinforcing fibers disposed in the matrix material.

In the inventive method, continuous fiber strands, continuous woven fiber fabrics and/or continuous knit webs or nonwoven webs are first fed to the forming chain system in a first step a). The term "continuous" refers to strands or webs of essentially any length, which can be wound around spools or rolls, for example, and continuously fed to the production system, as is also known, in itself, from the pultrusion methods.

Then, in a further step b), the strands and/or webs are first combined into a continuous preform batch. In an additional step c), the preform batch is then brought into contact with a working run of at least one rotary forming chain of the forming chain system. The preform batch is then guided through the forming chain system by the working run of the forming chain in an additional step d), wherein a continuous profile is formed from the preform batch by the simultaneous curing of the matrix material.

In subsequent steps e) and f), the continuous profile is ejected from the forming chain system and cut into lengths to form the profile component.

Here, the working run of the at least one forming chain is guided so that it slides along a sliding guide on the side of the working run facing away from the preform batch, and the outer surface of the forming chain is formed by surface links.

The method according to the invention is characterized in that the produced profile component acquires essentially any desired course in terms of its longitudinal axis, in terms of its cross-sectional form and/or in terms of its longitudinal surface in process step d) by means of at least one curve in the sliding guide for the forming chain and/or by means of differing heights and surface profiles of the forming chain surface links.

According to the inventive method, the fed strands or webs are optionally pre-impregnated, as is the case for example with prepreg strands or webs. Alternatively or additionally, the fed strands or webs may also be impregnated with the matrix material during one of the steps a), b) or c).

The impregnation of the strands or webs in steps a) or b) may be done in a manner similar to that of known pultrusion methods, wherein the strands or webs are first drawn through a bath of liquid matrix material, for example a resin bath, thereby absorbing the matrix material. Alternatively or additionally, the strands or webs may also be impregnated during or immediately preceding step c) wherein the liquid matrix material is fed to the preform batch, for example through an annular channel that runs around the preform batch, and from there, is injected into the preform batch.

The method according to the invention thus makes it possible to produce profile components in a continuous process and at the same time to completely overcome the limitations of the production methods known from the prior art (both the pultrusion methods and the lamination or injection methods).

In particular, thanks to the arrangement and guidance, according to the invention, of the preform batch on the at least one rotary forming chain, which in turn is guided along a sliding guide, it is possible to give the continuous profile formed from the preform batch and thereby to give the profile component essentially any course, including a variable course, of the cross-sectional form or the longitudinal axis thereof over the length of the profile component. This is due to the fact that in accordance with the principle of a primary mold that moves axially along with the curing preform batch, the forming chain transfers its surface contour exactly to the preform batch when the preform batch is cured. Each protrusion, each recess and each surface profile or curvature profile of the forming chain traveling along with the preform batch or the sliding guide is therefore reflected in the shaping of the curing preform batch and therefore also in the shaping of the finished profile component.

Alternatively or in addition to a possibly existing surface profile of the at least one forming chain, the working run of the forming chain may also extend in particular along a curved path in the shape of a circle segment. Likewise, the forming chain system may also comprise a number of forming chains, in particular two forming chains arranged opposite one another, and optionally, can also comprise additional guide plates, which enclose the preform batch along the preform batch and thereby give the preform batch the desired shape when the preform batch is run through the forming chain system. This is described in greater detail below in the description of the forming chain system according to the invention.

This means, in other words, that thanks to the inventive method, profile components of fiber composite material can be continuously produced that not only have essentially any course or essentially any surface structure of at least one longitudinal surface of the profile component (specifically the longitudinal surface that is facing the at least one forming chain during curing). Also, thanks to the invention—alternatively or in addition—the longitudinal axis of the profile component can have essentially any form deviating from the straight form, or can also have a course in the shape of a circle segment. Thanks to the invention, this can be achieved, for example, by using two opposing forming chains with appropriate surface contours that correspond with one another for the shaping of the preform batch. Alternatively or additionally, the at least one forming chain or two opposing forming chains can be arranged and guided in such a way that each working run follows a circularly curved path, whereby the profile can be produced with a correspondingly curved longitudinal profile axis.

Against this background, in a particularly preferred embodiment of the inventive method, the forming chain system comprises two forming chains, wherein in step c) the preform batch is in contact with and guided on the respective working run of both forming chains. Alternatively or additionally, the forming chain system preferably comprises at least one guide plate, wherein in step c) the preform batch is in contact with and guided on the working run of the at least one forming chain and additionally the at least one guide plate. Here, the working run of the at least one forming chain and the at least one guide plate enclose the preform batch on all sides along the preform batch.

The enclosure of the preform batch on all sides along the preform batch by at least one forming chain and at least one guide plate can be achieved, for example, in that a guide plate features a recess or contouring that encloses the preform batch on at least three longitudinal sides, while a fourth longitudinal side of the preform batch comes in contact with the working run of the forming chain. Likewise two opposing forming chains can enclose the preform batch accordingly on two opposite longitudinal sides, while two opposing guide plates enclose the preform batch on the two remaining longitudinal sides. These variants are also described in greater detail below in the description of the forming chain system.

Preferably, the forming chains or guide plates that are arranged opposite one another with respect to the travel of the preform batch through the forming chain system, by which the preform batch is enclosed along the preform batch preferably on all sides, are pressed against each other by means of a preloading apparatus. In this way, a defined, lateral pressure can be exerted on the preform batch while it passes through the forming chain system and cures. Excess matrix material that is still in liquid form can be pressed out of the preform batch in this manner prior to curing, as can unwanted air pockets. The high reinforcement/matrix volume ratio usually desired for demanding components can be set in a defined manner, and at the same time, high material quality can be achieved while simultaneously achieving high dimensional stability of the profile component produced.

A particularly preferred embodiment of the inventive method provides for the heating of the working run of the at least one forming chain and one or more possibly existing guide plates, which together guide the preform batch through the forming chain system and enclose it during curing. In this way, the curing of the matrix material can be crucially accelerated in the case of most materials, and correspondingly high throughput speeds and a high quantity output of the forming chain system are achieved. If, for example, the matrix material is a thermoplastic material, the forming chains and guide plates could be cooled instead.

According to an additional preferred embodiment of the inventive method, in an additional step a'), at least one insert part is positioned between or on the fed strands, woven fabrics, knitted fabrics or non-woven fabrics, integrated therewith into the preform batch and therefore laminated into the continuous profile or onto the continuous profile as the preform batch passes through the forming chain system. The at least one insert part is preferably a planar prepreg cut, a woven fabric cut, a knit fabric cut, a non-woven fabric cut, or a force-application component.

This embodiment of the invention, in other words, allows profile components to be produced in a continuous method for the first time, wherein those profile components not only can have variable cross-sectional forms or nearly any course of the longitudinal profile axis, but also can be provided with additional fiber layers and/or force-application insert components at defined locations, for example locations under especially high load.

In other words, thanks to this embodiment of the inventive method, the freedom of design, even for profile components that—especially for cost reasons—should or must be produced using a continuous method, are subject to almost no limits any more. Thanks to the invention, profile components can instead be produced with a wide variety of curvatures, courses of the longitudinal profile axis, or cross section courses over the length of the component likewise in a continuous method, such as profile components with thickenings, local reinforcements and force-application parts already completely laminated in.

Since until now, these kinds of complex profile components had to be produced almost exclusively piece by piece by means of largely manual lamination methods, the inventive method represents a decisive improvement in terms of a cost-effective method of serial production even of the most demanding profile components, in particular with high, reproducible component quality.

According to an additional preferred embodiment of the inventive method, in step c) a flexible elastic band, together with the preform batch, is guided through the forming chain system. The flexible elastic band is disposed between the preform batch and the at least one forming chain, or is disposed between the preform batch and the at least one guide plate, and thereby forms a contact surface for one of the longitudinal surfaces of the preform batch when the preform batch passes through the forming chain system.

This is particularly advantageous with regard to better separation of the matrix material that has not yet cured from the surfaces of the forming chain system, especially from the surface of the at least one forming chain, as well as with regard to especially high quality of the surface of the profile component being produced.

The flexible elastic band, which is entrained between the preform batch and the forming chain or the guide plate, thereby prevents the wetting of guide plates or forming chains with the matrix material that is not yet cured and prevents the unwanted adhesion of the matrix material to the guide plates or forming chains. In the event that a flexible elastic band is entrained between the preform batch and the forming chain, any gaps or uneven sections between the chain links of the forming chain are also bridged in order that they cannot create an impression in the surface of the profile component being produced and thereby impair the surface quality.

The use of the "flexible-elastic" attribute in relation to the band disposed between the preform batch and the forming chain or guide plate primarily affects the gap-bridging and smoothing function of the flexible elastic band, which requires a specific elasticity of bending that is not too low. Independently thereof, the flexible elastic band may also exhibit a longitudinal elasticity, which however is not of immediate significance for the embodiment of the invention being discussed.

The invention also relates to a forming chain system for the continuous production of fiber composite material profile components using a continuous preform batch of an arrangement of reinforcing fibers impregnated with a matrix material. For this purpose, the forming chain system comprises at least one first, continuous rotary forming chain with a working run, which faces the path of the preform batch through the forming chain system, wherein the at least one forming chain serves to shape, guide and compress the preform batch during the curing of the matrix material as the preform batch is passed through the forming chain system. Here, the working run of the at least one forming chain is guided in a sliding manner along a sliding guide on the side of the working run facing away from the preform batch, and the outer surface of the forming chain is formed by surface links of the forming chain.

According to the invention, the forming chain system is distinguished by the fact that the surface of the working run of the at least one forming chain features essentially any variable course in terms of the longitudinal axis, the cross-sectional form and/or the longitudinal surface of the continuous profile, on the basis of at least one curvature of the sliding guide and/or on the basis of varying heights and surface profiles of the surface links.

In this way, according to the invention, the result is that the desired profile is created along the working run of the forming chain, with a variable profile cross section that can be designed almost freely, almost any shape of the profile surface, or almost any course of the longitudinal profile axis both for the preform batch and therefore also for the finished profile component. Thanks to the invention, there are almost no limits on the continuous production of profile components of nearly any shape, with almost any cross-sectional forms and almost any course of the longitudinal profile axis. Rather, not only can straight or uniformly curved profile components having an essentially uniform cross section over the entire length be produced with the forming chain system according to the invention, but also straight, non-uniformly curved, or irregularly formed profile components can be continuously produced, optionally having highly extensive inserts, reinforcements, force-application points or connection points, immediately while passing through the forming chain system.

The invention is initially realized by the drive and the support of the forming chain, independently of the concrete course of the forming chain as well as of the design of the forming chain, as long as the forming chain fulfills the desired guidance and compression function for the preform batch during its passage through the forming chain system. In any case, however, due to the arrangement of the sliding guide on the side of the working run of the forming chain facing away from the preform batch, the path of the working run of the forming chain can be precisely defined and controlled during the guidance of the preform batch through the forming chain system.

According to a preferred embodiment of the forming chain system according to the invention, the sliding guide describes a radius along the path of the working run of the forming chain. This means, in other words, that the form of the sliding guide and therefore also the form of the working run of the forming chain essentially correspond to a circular segment. The radius of the course of the sliding guide is preferably variably adjustable. In this way, in particular profile components curved in a circular arc shape with essentially any desired curvature radius can be produced in a continuous process using the forming chain system according to the invention.

With regard to high rigidity of the entire system, the sliding guides can be supported in guidance rails, which can, in particular, be supported directly on, or embedded in the factory floor. Thus, it is easily possible to set various bending radii for the sliding guides. This applies in particular when the forming chain system is to exceed a size that can still be supported in a machine bed.

Given the ability to variably adjust the sliding guide radius and therefore the radius of the working run of the forming chain, according to a further preferred embodiment of the invention, each of the surface links, which form the outer surface of the forming chain, is slightly movable relative to one another along the longitudinal direction of the chain.

The manner in which the relative longitudinal mobility of the surface links in the longitudinal direction of the chain is realized in terms of design is initially irrelevant to the invention. To this end, for example, the surface links can be disposed on a base chain that supports the surface links such that they are somewhat floatingly supported in the longitudinal direction of the forming chain, so that each surface link has limited relative mobility in the longitudinal direction of the forming chain.

The longitudinal mobility of the surface links of the forming chain serves to provide the forming chain with a surface as seamless and closed as possible, even with differently adjusted curvature radii, and within this context is necessary, since the surface links of the forming chain always have a specific thickness dimension. For this reason, even when there are different curvature radii of the chain course, for the desired, seamless mutual connection of the crown area of the surface links (in the area of the chain surface) there is a need for an at least slightly variable spacing of the surface links from one another in the base area of the surface links, or in the area where the surface links are connected to the base chain that supports them.

The surface links of the forming chain in this case preferably feature an undercut or a width that decreases toward the base area in the longitudinal direction of the chain, starting from the crown-side surface of the surface links. The undercut allows the working run of the forming chain to take on not only concave, but also convex curvatures without causing gaps to open up between the crown-side surfaces of the surface links because those surface links bump into one another in the base area.

In principle, the present invention can be realized with just a single forming chain, with which the preform batch is brought in contact during the curing of the matrix material, for example when producing a comparatively simple, even or curved flat profile.

Against the background of also producing more complex profile forms or more demanding profile components, according to further embodiments of the invention, the forming chain system features at least one guide plate or at least one additional forming chain. Here, the guide plate or the additional forming chain is disposed—along the first forming chain—facing the preform batch, i.e., on the other side of the path of the preform batch. Alternatively or additionally, at least one guide plate can be disposed at a right angle to the at least one forming chain along the path of the preform batch.

In this way, it is possible to achieve a preferred enclosure of the preform batch on all longitudinal sides of the preform batch during the passage of the preform batch through the forming chain system, as well as a correspondingly defined shaping of all longitudinal surfaces and therefore of the cross-sectional form of the profile component being produced.

An enclosure of the preform batch on all longitudinal sides can be achieved, for example, by just a forming chain and a guide plate opposite the forming chain, wherein the guide plate features a recess in the cross-sectional form, which encloses the preform batch on up to three longitudinal sides, while the fourth longitudinal side of the preform batch is brought into contact with the working run of the forming chain.

Another option for the enclosure of the preform batch on all longitudinal sides during the passage of the preform batch through the forming chain system is that two opposing forming chains be provided that enclose the preform batch on accordingly two opposite longitudinal sides, while two essentially flat guide plates that are disposed at right angles to the forming chains enclose the preform batch along the other two longitudinal sides.

In all of these cases, which merely serve as examples and which are not exhaustive, the preform batch is enclosed on all longitudinal sides and therefore the surfaces or cross section of the profile component being produced is shaped in a precisely definable manner.

In reference to the path of the preform batch, according to a further especially preferred embodiment of the invention, opposing forming chains and/or guide plates of the forming chain system can be pressed together (or in the direction of the preform batch) by means of a preloading apparatus or advanced towards one another accordingly in a controlled manner.

As a result of this option of pressing together or advancing two opposing forming chains or guide plates, the especially precise control and adjustment of the quality of the component being produced are enabled. In this way, it is in particular possible to precisely define the matrix content or the weight- or volume-related matrix/reinforcement ratio and thereby to produce components in a manner that is reproducible with an especially high degree of material quality and mechanical strength. As a result of this option of pressing together the preform batch throughout its entire path through the forming chain system and therefore during the entire curing process, unwanted air pockets can also be virtually eliminated.

The invention is first realized independently of the design and the shape of the at least one forming chain, as long as the preform batch can be guided and optionally compressed by means of the at least one forming chain during its passage through the forming chain system. In terms of an enclosure of the preform batch on its longitudinal sides that is as tight as possible and in terms of a surface of the profile component being produced that is as high-quality as possible, however, according to an especially preferred embodiment of the invention, the forming chain forms an essentially smooth closed chain surface on the side of the forming chain facing the preform batch.

Alternatively or additionally, in a further embodiment of the invention, a flexible elastic band, for example of plastic or metal, is disposed between the working run of the forming chain and the path of the preform batch through the forming chain system.

The flexible elastic band between the working run of the forming chain and the preform batch can serve to create a better separation between the matrix material of the preform batch, which is initially still liquid, and the forming chain so that wetting of the forming chain with the still liquid matrix material is largely eliminated. In addition, the flexible elastic band also improves the quality of the surface of the finished profile component by equalizing any gaps or uneven areas in the surface of the forming chain, in particular in the area of the transition between two chain links.

According to a possible embodiment of the invention, the flexible elastic band is disposed along the outside of the forming chain, and together with the forming chain, rotates in the forming chain system. Here, the flexible elastic band does not necessarily have to have the same length as the outside of the forming chain, but rather can also be guided separately from the forming chain, at least at parts of the length of the flexible elastic band.

In another embodiment of the invention, the flexible elastic band is fed to the forming chain system or to the path of the preform batch together with the fiber strands and/or with the woven webs, knit webs or nonwoven webs. The flexible elastic band, which in this case (similar to the fiber strands and/or woven webs, knit webs or nonwoven webs) is fed as a continuous material, is likewise disposed between a surface of the preform batch and a forming chain and serves there as a separating layer or as a smoothing intermediate layer between the surface of the forming chain and the surface of the profile component being produced.

After the cured continuous profile has been ejected from the forming chain system, the flexible elastic band, which was previously fed as a continuous material, can be removed from the surface of the continuous profile and possibly reused, depending on the design, material and function of the band. In another embodiment, however, the flexible elastic band can remain on the surface of the continuous profile, and therefore on the surface of the profile component that is finally produced.

According to further embodiments of the invention, the surface of the flexible elastic band that faces the preform batch (or the surface of the forming chain that faces the preform batch if no flexible elastic band is used between the preform batch and the forming chain) can have a surface profile that is not smooth.

Thus the profile component can receive a surface that is not smooth, or that is embossed, and that corresponds to the surface structure of the forming chain or flexible elastic band, immediately during the primary forming by means of the forming chain system. Here, various kinds of surface structures are conceivable, such as longitudinal or transverse grooves on the surface of the molded part, protuberances, depressions or micro-prismatic structures, which can be formed in the surface of the profile component directly during the continuous production of the profile component.

According to a further preferred embodiment of the forming chain system according to the invention, the forming chain system has an apparatus for feeding insert parts, reinforcement layers and the like, as well as for positioning the insert parts or reinforcement layers in or on the preform batch.

The insert parts or reinforcement layers can be fed to the forming chain system especially in the area where the continuous strands or continuous webs are fed, and positioned either between or on the fed continuous strands or continuous webs in such a way that the insert parts or the reinforcement layers become an integrated component of the preform batch by the time the preform batch enters the forming chain system. Insofar as the insert parts or reinforcement layers result in local changes in the cross-sectional area of the preform batch, which in most cases will be the case, the surface of the forming chain is adapted through corresponding shaping of the individual chain links in such a way that the forming chain can accommodate the corresponding local changes of the cross-sectional area of the preform batch and can enclose said local changes in a correspondingly controlled manner during the curing process as the preform batch passes through the forming chain system.

Examples of possible insert parts or reinforcement layers are virtually unlimited and in particular may include woven fabric cuts, knit fabric cuts or non-woven fabric cut, prepreg cuts and/or design or force-application components such as plates, inserts or threaded receptacles.

The invention also relates to a profile component of fiber composite material, which is produced by means of a forming chain system according to one of the embodiments described above. The profile component features largely any desired variable course of the longitudinal axis, of the cross-sectional form and/or of the longitudinal surface over the length of the profile component.

The longitudinal profile axis of the profile component according to the invention can thus feature nearly any, e.g., uniform or non-uniform curved course for the first time for a profile continuously produced in a continuous method thanks to the forming chain system. Likewise the shape and size of the profile cross section or the longitudinal surface of the profile component can feature nearly any desired course over the length of the profile component.

According to a further embodiment of the profile component according to the invention, the profile component features at least one insert part in the form of a woven fabric cut, knit fabric cut or non-woven fabric cut, in the form of a prepreg cut and/or in the form of a force-application component. Preferably, the profile component has a thickening in the profile cross section in the area of the at least one insert part, which thickening is made possible during production by a corresponding profiling of the chain links of the forming chain. This embodiment has the advantage that the profile component is largely ready for installation including the desired insert parts, once the profile component has left the forming chain system in the form of the cured continuous profile and has been cut to length.

According to a further possible embodiment for the profile component according to the invention, the profile component features a non-smooth surface profile on at least one of its longitudinal surfaces. This too is possible due to the production of the profile component on the basis of the forming chain system likewise according to the invention, in particular as the surface of the forming chain that faces the profile component, or a flexible elastic band disposed between the forming chain and the profile component, features a surface texture that is transferred to the surface of the profile component being produced as the preform batch passes through the forming chain system.

The profile component according to the invention can be used in essentially all areas of technology in which heavy duty components of fiber composite material are needed. However, according to especially preferred embodiments of the invention, the profile component is a former or a stringer for the fuselage of an aircraft or the hull of a watercraft, or a leaf spring or transverse leaf spring, in particular for the chassis of a motor vehicle.

In all of these use cases, profile components are needed on which high demands are placed in regard to load capacity and which at the same time have as low a weight as possible, and for which a variable course of the curvature and/or of the cross-sectional area over the length of the profile component is also required. Last but not least, demanding profile components such as stringers, formers or leaf springs in general need especially reinforced places (and where applicable, having insert parts) in the component at which force application or the connection of connecting components can occur. All such requirements can be met by the profile component according to the invention, by the forming chain system according to the invention, and by the production method according to the invention.

BRIEF DESCRIPTION OF THE DRAWINGS

The invention is explained below in greater detail with reference to drawings that merely depict examples of embodiments. The drawings show.

DETAILED DESCRIPTION OF THE PREFERRED EMBODIMENTS

Figure 1:
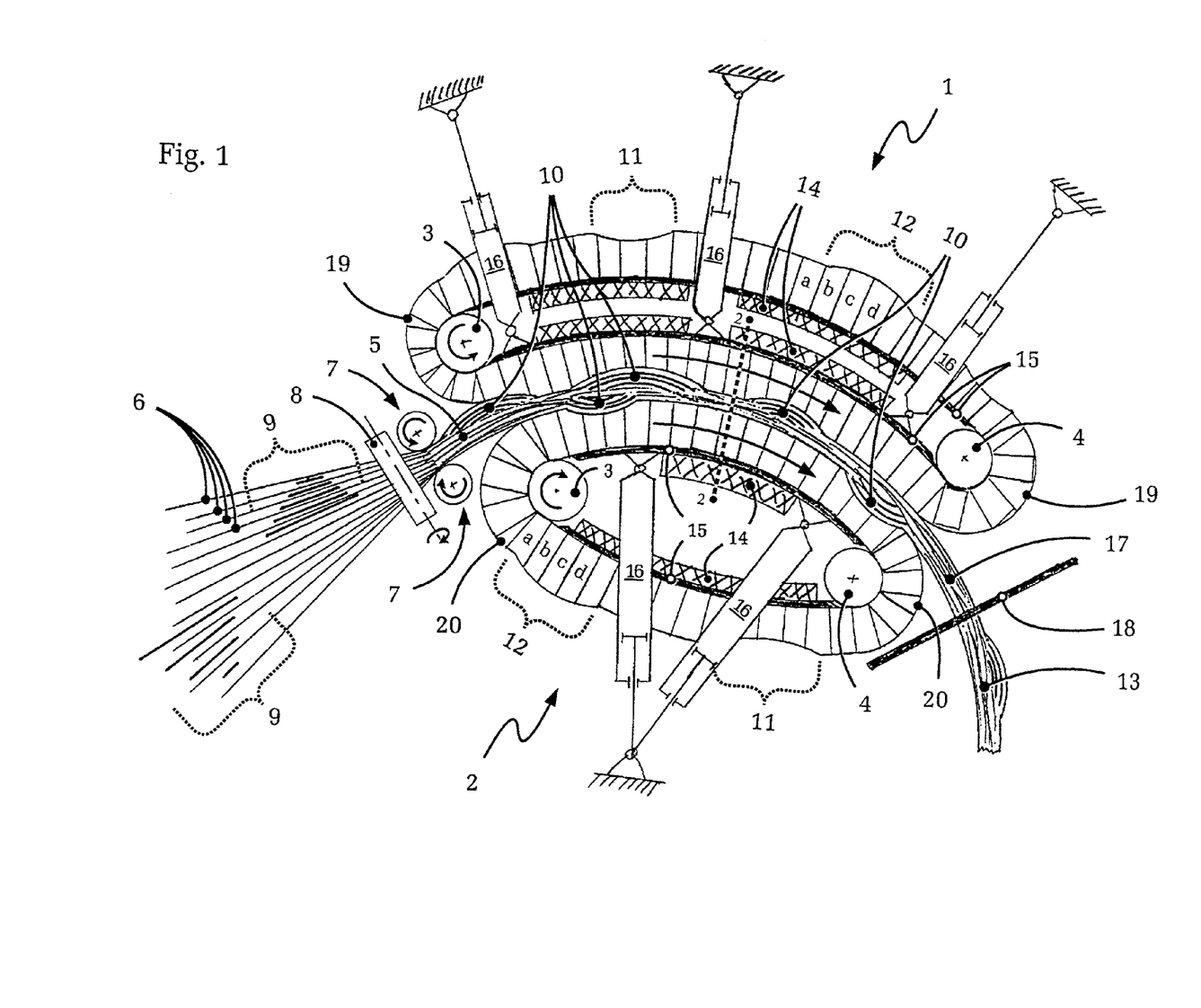
FIG. 1—A schematic representation of an embodiment of a forming chain system according to the invention in plan view and in a longitudinal section.
Figure 2:
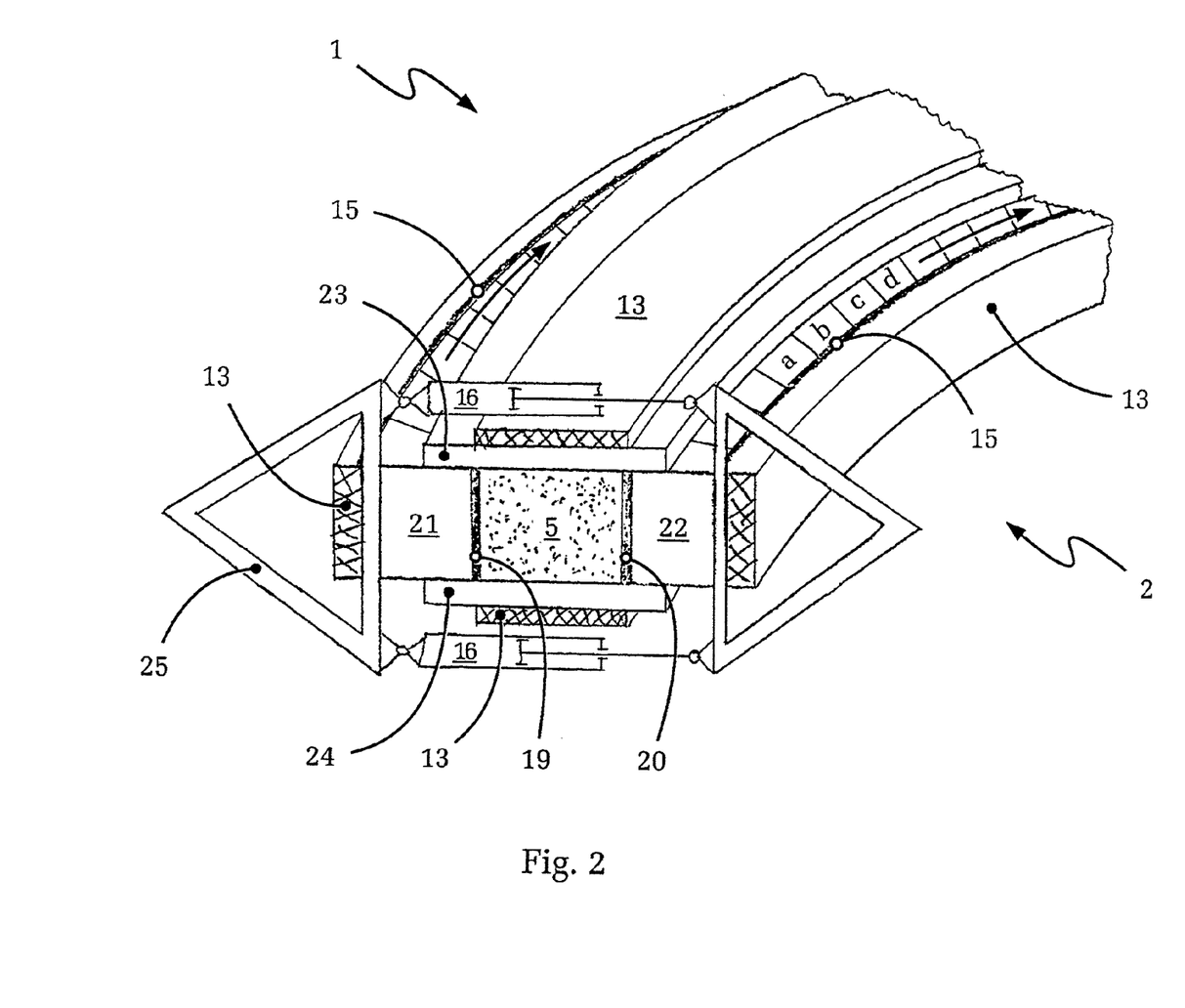
FIG. 2—An enlarged isometric representation of a cross section through the area of the preform batch and the working run of the forming chains for a forming chain system similar to FIG. 1.

FIGS. 1 and 2 show different views of a forming chain system according to the invention for producing the fiber composite molded part, likewise according to the invention, based on the inventive method also according to the invention.

In FIG. 1, first of all, two forming chains 1, 2 disposed in the forming chain system in a rotary manner are shown. In the embodiment shown, the forming chains 1, 2 are each guided over a pair of deflecting rollers 3, 4 and if necessary driven in the direction of movement through the forming chain system by the preform batch 5 by means of the deflection rollers 3, 4. The driving can, in particular, be CNC controlled in order to ensure the feed rate, as well as additional associated process variables, in particular such as matrix content, component cross section and duration of cuing, are maintained as precisely as possible.

In the embodiment shown, the preform batch 5 is formed by a number of fed continuous fiber strands 6, continuous woven fiber fabrics and/or continuous knit webs or nonwoven webs 6. This is done by bundling the fed base strands 6 or base webs 6 by means of a roller assembly 7, 8 and subsequently feeding them to the inlet between the forming chains 1, 2. Prior to the formation of the preform batch 5 additional woven fabric cuts, knit fabric cuts or non-woven fabric cuts 9, prepreg cuts 9 and/or force-application components 9 can be disposed or placed between the fed base strands or base webs 6 by means of a handling device (not shown) and in this way, be incorporated into the preform batch 5 during the bundling by the roller assembly 7, 8.

The placement of the cuts 9 or insert parts 9 is preferably done in such a way that the cuts 9 or insert parts 9 are not released by the handling device until the cuts 9 or insert parts 9 have been gripped by the intake roller assembly 7, 8 so that the cuts 9 or insert parts 9 can no longer slip.

The cuts 9 or insert parts 9 that are additionally incorporated into the preform batch 5 generally result in local cross-sectional changes or thickenings 10 in the preform batch 5. The shaping of the forming chains 1, 2 take into account the cross-sectional changes or thickenings 10 in that the chain links a, b, c, d, etc. of the forming chains 1, 2 are contoured accordingly on the outside thereof, that is, on the side thereof facing the preform batch 5. In this way, corresponding recesses 11 or elevations 12 are formed along the surface of the respective working run of the forming chains 1, 2 facing the preform batch 5, for example in the area of the thickenings 10 of the preform batch 5.

Here, the recesses 11 in the surface of the forming chains 1, 2 accommodate the thickenings 10 of the preform batch 5 and thereby enclose these in a controlled manner during the curing of the preform batch 5 as it runs through the forming chain system. Similarly, elevations 12 on the surface of the forming chains 1, 2 can also be provided, which enclose or compensate for any areas of the preform batch 5 with a reduced cross section.

The elevations 12 and recesses 11 can also be disposed along the surface of the forming chains 1, 2 in such a way that a recess 11 on the surface of a first forming chain 1 essentially corresponds to an elevation 12 on the surface of a second forming chain 2 or vice versa. In this way, in particular profile components 13 that feature nearly any curved, including variably curved, or otherwise formed course of the longitudinal profile axis can be produced by enclosing the preform batch 5 (for example with an unmodified cross section) between the forming chains 1, 2 with appropriate elevations 12 and recesses 11 in such a way that the result is the desired course of the longitudinal profile axis. Naturally a combination of a longitudinal profile axis having nearly any course with corresponding thickenings 10 on a profile component 13 is also possible. Similarly, profile components 13 can also be created that feature a continuously diminishing or increasing cross section along their length, for example, as is frequently the case for example with leaf springs, but also with reinforcement components.

With respect to the universal applicability of the forming chain system, the forming chains 1, 2 are each formed of exchangeable units. In the event that the production is converted to profile components 13 with a different cross-sectional course, the forming chains 1, 2 are thus adapted accordingly in terms of their surface contour or exchanged. Likewise, the positions and spacing of the deflection rollers 3, 4 can be changed in order to adapt the system to different component sizes and radii of curvature. With the same background, a respective chain-tensioning device can be provided in the area of the return run of each of the forming chains 1, 2 in order to accommodate or compensate for any length differences of the forming chains 1, 2 depending on the positioning of the deflection rollers 3, 4 or depending on the set radius of curvature for the profile 17 being produced.

The manner in which the matrix material is specifically fed to the strands or webs 6 and to any additionally fed cuts 9 is initially insignificant to the realization of the invention. Thus the fed strands or webs 6 (and any additionally fed cuts 9) can be pre-impregnated, for example in the form of prepreg webs or prepreg rovings. Likewise, the impregnation of the strands or webs 6 being fed (and where applicable, the cuts 9 that are additionally fed) can be done in a bath of liquid matrix material, for example, which is disposed in the area where the strands or webs 6, 9 are fed. The bath containing liquid matrix material can also be placed upstream of the feeding of the strands or webs 6, 9 in the working direction.

With respect to a simple impregnation of the base strands or base webs 6 being fed (in advance of any insertion or placement of additional woven fabric cuts, knit fabric cuts or non-woven fabric cuts, prepreg cuts 9 and/or force-application components 9 between the base strands or base webs 6), it can be sensible to first combine the base strands or base webs 6 themselves and guide them through the bath of liquid matrix material. The base strands or base webs 6 thus impregnated with the matrix material can subsequently be fanned out again in order that, for 9, additional woven fabric cuts, knit fabric cuts or non-woven fabric cuts, prepreg cuts 9 and/or force-application components 9 can be laid between the base strands or base webs.

It is also possible to first introduce the matrix material into the preform batch 5 in the area of the roller assembly 7, 8 (or after passing of the preform batch through the roller assembly 7, 8 in the direction of movement of the preform batch 5). The infiltration of strands or webs 6, 9 can be done immediately before the roller assembly 7, 8, for example, by means of one or more wide nozzles from which a stream of liquid matrix material impregnates the strands or webs 6, 9, which are not yet completely bundled. Excess matrix material is pressed out by the roller assembly 7, 8 immediately afterwards and can be returned for reuse.

Alternatively, the infiltration of the strands or webs 6, 9 can also be performed by the roller assembly 7, 8 itself in such a way that the rollers 7, 8 run in a bath of matrix material, whereby the strands or webs 6, 9 are worked through with matrix material as they pass through the rollers 7, 8. In this case, excess matrix material can be removed by a scraper device (not shown) following the roller assembly 7, 8 and returned for reuse.

A further variant for the infiltration of the strands or webs 6, 9 with matrix material consists of a ring channel disposed around the preform batch 5, through which the matrix material is injected into the preform batch 5. The injection ring channel can be disposed for this purpose in the area between the roller assembly 7, 8 and the inlet of the preform batch 5 into the forming chains 1, 2, for example.

In any event, the enclosure of the preform batch 5 along the longitudinal sides by the forming chains 1, 2 ensures that excess matrix material is pressed out of the preform batch 5 as the preform batch 5 runs in between the forming chains 1, 2. In order to accelerate the curing of the matrix material as the preform batch 5 passes through the forming chain system, the forming chains 1, 2 in the depicted embodiment are heated by heating elements 14. The heating elements 14 are disposed here on the back side of sliding guides 15 with which the respective run of the forming chain 1, 2 is guided.

In the embodiment of the forming chain system shown, the sliding guides 15 disposed on the two working runs of the forming chains 1, 2 are each pressed in the direction of the preform batch 5 by means of a pressing device with hydraulic or pneumatic cylinders 16. In this way, unlike the pultrusion methods known from prior art, the high reinforcement/matrix volume ratio or weight ratio usually desired for heavy-duty profile components 13 can be set and reproducibility controlled, and as a result, a particularly deep infiltration of the reinforcing fibers with the matrix material and thus mechanically very high quality components can be obtained. In this way, unwanted air pockets in the matrix material of the continuous profile 17 or the finished profile component 13 are also expelled before the curing of the matrix material and thereby prevented.

In the embodiment shown, the radius of the course of the sliding guides 15 can be variably adjusted by suitably controlling the cylinders 16, and so continuous profiles 17 or profile components 13 can be produced with widely different radii of curvature all the way to entirely straight profile components 13.

With regard to a high degree of stiffness of the entire system, the sliding guides 15 can be mounted or supported, in particular directly on or in the factory floor.

Once the preform batch 5 has cured and the cured preform batch 5 or the continuous profile 17 thus formed has been ejected, the continuous profile 17 is cut to length by a suitable cutting device 18, for example by a circular saw 18 that travels along in the direction of movement of the continuous profile 17, whereby the profile component 13 is obtained.

Also visible in FIG. 1 are the flexible elastic bands 19, 20, which are disposed on the outer surface of the chain links a, b, c, d, etc. in the embodiment shown and which rotate together with the respective forming chain 1, 2. The flexible elastic bands 19, 20, which could, for example, take the form of spring steel bands, separate the surface of the forming chains 1, 2 from the still liquid matrix material of the preform batch 5, and at the same time ensure an evenly smooth (or in the case of profiled or patterned band surfaces, also profiled or patterned) surface on the finished profile component 13.

FIG. 2 shows an isometric representation of a cross section through the working runs 21, 22 of the forming chains 1, 2 along the section line 2-2 drawn in FIG. 1, viewed in the direction in which the preform batch 5 passes through the forming chain system. In FIG. 2 it can initially be seen that, in addition to being enclosed by the two forming chains 1 2, the preform batch 5 is enclosed on its two additional longitudinal sides by forming or guide plates 23, 24. The guide plates 23, 24, like the forming chains 1, 2, are provided with heating elements 14 on the back side in order to accelerate the curing of the matrix material in the preform batch 5.

It can be seen that in this way, the preform batch 5 is enclosed on all longitudinal sides by the two working runs 21, 22 of the forming chains 1, 2 and by the guide plates 23, 24, which ensures the effective and reproducible control of the shaping and of the reinforcement/matrix ratio for the preform batch 5 and therefore for the profile component 13.

A respective flexible elastic band 19, 20 is also disposed between each of the two working runs 21, 22 of the forming chains 1, 2 and the preform batch 5, which provides for a uniformly smooth surface of the longitudinal sides of the preform batch 5 facing the working runs 21, 23 of the forming chains 1, 2 and therefore of the profile component 13 as well. The flexible elastic bands 19, 20 also prevent the still fluid matrix material from adhering to the surface of the forming chains, and prevent the still liquid matrix material from penetrating between the chain links a, b, c, d of the forming chains 1, 2 in the area of the working runs 21, 23.

In the cross-sectional representation according to FIG. 2, the pressing device with the cylinders 16 is designed differently in its details from the pressing device according to FIG. 1, in order to make the various options or the design of the pressing device clear. In the case of the pressing device according to FIG. 2, the cylinders 16 are arranged on corresponding subframes 25 in such a way that the cylinders 16 act directly between the two sliding guides 15. In this way, the sliding guides 15 and therefore also the working runs 21, 22 can be pressed against each other again in a controlled manner in order to reproducibly ensure a high degree of quality and dimensional stability of the profile component being created.

Figure 3:
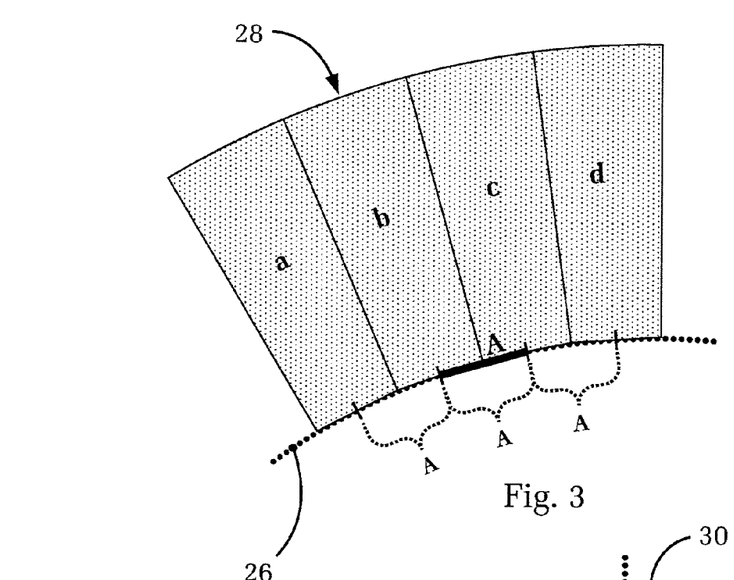
FIG. 3—A schematic, enlarged representation of a partial side view of a forming chain for an embodiment of a forming chain system according to the invention.
Figure 4:
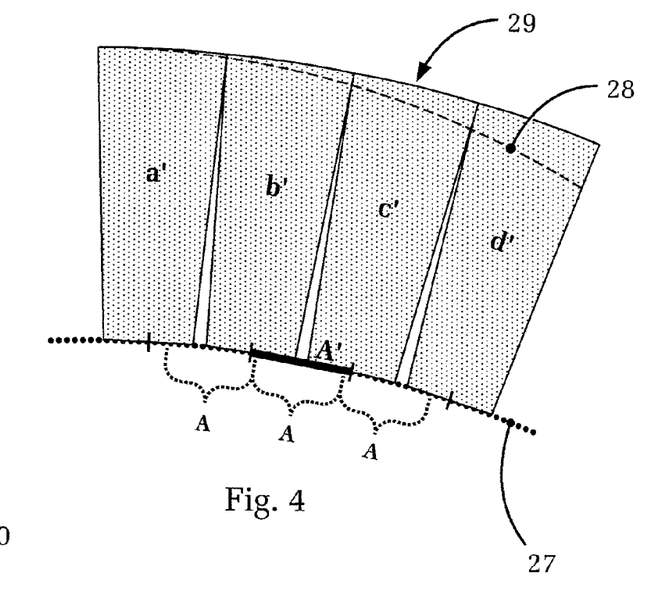
FIG. 4—A representation and view corresponding to FIG. 3 of the detail of the forming chain according to FIG. 3 with an increased course radius of the forming chain.
Figure 5:
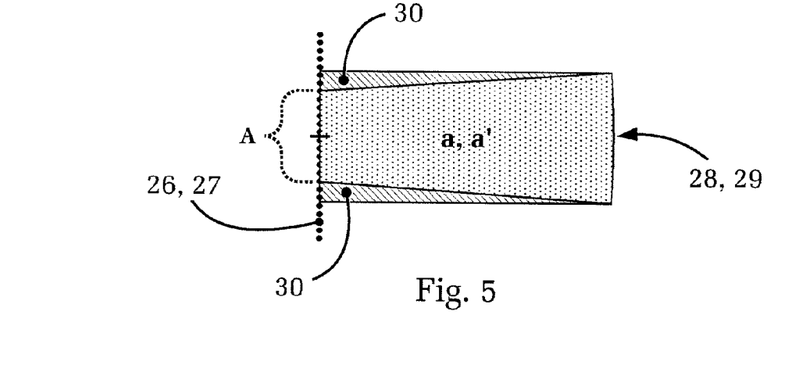
FIG. 5—A representation corresponding to FIGS. 3 and 4 of a surface link of the forming chain according to FIGS. 3 and 4 depicting the undercut.

In FIGS. 3 to 5, schematic representations clarify the way in which the course of the working run of the forming chain of a forming chain system according to the invention can be realized along differently sized radii of curvature, wherein at the same time, a closed surface of the forming chain is retained in the area of the contact with the preform batch 5.

To this end, FIG. 3 schematically shows first a section of the working run of a forming chain, wherein similar to in FIGS. 1 and 2, the working run features a curved course in order to thereby produce profile components 13 with a uniform base curvature of the longitudinal profile axis. In the case of the embodiment according to FIGS. 3 to 5, the forming chain consists of a base chain 26 or 27, on which surface links a, b, c, d, etc. are disposed, and which is only indicated schematically here. In the example according to FIG. 3, the base chain 26 extends along a relatively small radius of curvature in order to produce profile components with a curvature that corresponds to the chain surface in 28.

If the forming chain system is now to be converted in order to produce profile components with another curvature, for example with a larger radius of curvature, the result of this conversion of the forming chain system is depicted in FIG. 4. It is evident that the course of the base chain 27 follows a larger radius of curvature as compared to the situation according to FIG. 3. Accordingly, the crown-side surfaces of the surface links a', b', c', d' in 29 also form a correspondingly enlarged radius of curvature, resulting in a corresponding shaping of the preform batch (not shown here) lying on the crown area 29 of the surface links a', b', c', d'. For comparison, the smaller radius of curvature of the surface 28 for the course of the forming chain according to FIG. 3 is shown as a dashed line in FIG. 4.

In any event, since a very smooth shaping of the surface of the preform batch requires a correspondingly smooth course of the crown surface of the forming chain in 29, the crown areas 28, 29 of the surface links a, b, c, d or a', b', c', d' must abut one another directly. In this way, the still liquid matrix material is also prevented from penetrating between the links of the forming chain.

For this reason, however, in the case of different radii of curvature of the forming chain, as are contrasted in FIGS. 3 and 4, it is necessary that the base area of the surface links a, b, c, d or a', b', c', d' feature different spacings A or A' depending upon the radius of curvature in the area of the base chain 26, 27. It can be seen that the mounting distances A' of the surface links a', b', c', d' on the base chain 27 in the case of a larger radius of the chain course according to FIG. 4 must be greater than the mounting distances A of the surface links a, b, c, d in the case of a smaller radius of the chain course according to FIG. 3.

In order that it not be necessary to readjust the forming chain die surface links a', b', c', d' or rearrange those links to the correct spacing A' on the base chain 27 for every change in the radius of curvature of the forming chain, the surface links a, b, c, d or a', b', c', d' are floatingly disposed on the base chain 26, 27 in the longitudinal direction of the chain in the embodiment depicted in FIGS. 3 to 5. In this way, it is possible for the surface links a, b, c, d or a', b', c', d', to independently regulate the spacing of their base points on the base chain 26, 27 so that their surfaces at their crown areas 28, 29 abut one another directly without gap openings between the surface links.

In the event that the radius of curvature of the working run of the forming chain is increased (as is the case in the example in FIG. 4 as compared to the smaller radius of curvature according to FIG. 3) the spacing A' of the base points of the surface links a', b', c', d', is thereby increased while the crown areas of the surface links a', b', c', d' abut one another directly without change in 29. In other words, this means that the surface links a', b', c', d' tend to be displaced from the area of the working run of the forming chain when the radius of curvature in the working run of the forming chain is increased, which makes it necessary for the surface links a', b', c', d' that are displaced from the area of the working run to be accommodated in the area of the returning empty run of the forming chain.

This can be accomplished, for example, in that when there is an increase in the radius of curvature in the working run of the forming chain, there is a corresponding decrease in the radius of curvature of the empty run of the forming chain (whereby the surface links in the area of the empty run move closer together and therefore are able to accommodate the surface links displaced from the working run). The same is true in the reverse case, in that when there is a decrease in the radius of curvature in the working run of the forming chain, there is a corresponding increase in the radius of curvature in the empty run of the forming chain so that surface links tend to be displaced from the empty run and can be accommodated in the working run according to their reduced spacing in the working run.

The rounding of the crown areas 28, 29 of the surface links a, b, c, d or a', b', c', d' is done in such a way that it gives rise to a completely smooth surface 28 at a median radius from the range of possible radii of curvature of the working run of the forming chain. With this embodiment of the rounding of the crown areas 28, 29 of the surface links, the surface 29 of the forming chain deviates only slightly from the ideal smooth form when radii of curvature other than the median or preferred radius of curvature are selected.

Finally, FIG. 5 once again shows one of the surface links a, b, c, d or a', b', c', d', wherein FIG. 5 shows the undercuts 30 that are needed in order to also be able to realize convex curves with the forming chain, as is the case in FIGS. 3 and 4, and likewise in the forming chain 2 according to FIGS. 1 and 2.

The depicted removal of material in the undercut areas 30 of the surface links a, b, c, d or a', b', c', d' makes it possible for the base areas of the surface links (in the base chain area in 26, 27) to move closer together than the crown areas (in the surface area of the forming chain in 28, 29), which is a prerequisite for a convex curvature of the forming chain. The minimal spacing of the base areas of the surface links in 26, 27 corresponds to the base width A of the individual surface link, which is the case with the radius of curvature of the forming chain according to FIG. 3.

In the result, it is therefore clear that for the first time, thanks to the invention, even the most demanding fiber composite profile components can be produced with a high degree of reproducible quality in a continuous method, wherein virtually all disadvantages of the production methods known from prior art are overcome. In particular, thanks to the invention, even profiles with a variable cross section and/or having nearly any course of the longitudinal profile axis can be produced. At the same time, the profiles can also be provided with local reinforcements, thickenings, attachments and inserts, especially for force application, during the primary forming. Reworking or the laborious and, in terms of stability, problematic subsequent mounting, in particular, of force-application elements can thus almost completely be omitted.

The invention thus provides a fundamental contribution to the further development of cost-effective, reproducible and scalable production options for demanding fiber composite components, especially for the building of land vehicles, watercraft and aircraft.

LIST OF REFERENCE CHARACTERS 1, 2 forming chain
3, 4 deflecting roller
5 preform batch
6 fiber strands, woven fiber webs, knit webs, nonwoven webs
7, 8 roller assembly
9 insert parts
10 thickening, reinforcement
11 recess of the forming chain surface
12 elevation of the forming chain surface
13 profile component
14 heater
15 sliding guide
16 reciprocating cylinder
17 continuous profile
18 cutting device
19, 20 flexible elastic band
21, 22 working run
23, 24 guide plate
25 subframe
26, 27 base chain
28, 29 chain surface, crown area
30 undercut

The invention claimed is:

1. A method for continuous production of profile components of fiber composite material with a forming chain system, the fiber composite material comprising a matrix material and an arrangement of reinforcing fibers, the method comprising the steps of:
   a) feeding at least one of continuous fiber strands, continuous woven fiber webs, knit webs and nonwoven webs, and positioning at least one discrete insert part between or on the at least one of the continuous fiber strands, continuous woven fiber webs, knit webs and nonwoven webs;
   b) combining the at least one discrete insert part and the at least one of the continuous fiber strands, the continuous woven fiber webs, the knit webs and the nonwoven webs into a continuous preform batch;
   c) bringing the preform batch into contact with a working run of the forming chain system between two rotary forming chains comprised of links guided in a sliding manner along sliding guides each having a curvature on a side facing the preform batch;
   d) guiding the preform batch through the forming chain system by the working run of the forming chains and forming a continuous profile having a curvature by curing the matrix material;
   e) ejecting the continuous profile from the forming chain system; and,
   f) cutting the continuous profile to a desired length to form the profile component,
   wherein the links of the forming chain are contoured to accommodate the increased preform batch thickness at the location of the at least one discrete insert part, and the at least one of the continuous fiber strands, the continuous woven fiber webs, the knit webs and the nonwoven webs are at least one of pre-impregnated with the matrix material and impregnated with the matrix material during one of the step a), step b) and step c).

2. The method according to claim 1, further comprising the step of contacting and guiding the preform batch, during the step c), on the working run of the forming chains of the forming chain system.

3. The method according to claim 2, further comprising the step of, during the step c), pressing the forming chains and guide plates, which are disposed opposite one another with respect to a path of the preform batch, against one another by a preloading apparatus.

4. The method according to claim 1, further comprising the step of contacting and guiding the preform batch, during the step c), on at least one guide plate, the working run of the forming chains and the at least one guide plate encloses the preform batch on all longitudinal sides.

5. The method according to claim 4, further comprising the step of heating the working run of one or more of the forming chains and the at least one guide plate to accelerate the curing of the matrix material.

6. The method according to claim 4, further comprising the step of entraining, during step c), a flexible elastic band either between the preform batch and the forming chains or between the preform batch and the at least one guide plate.

7. The method according to claim 1, further comprising the step of positioning the at least one discrete insert part, during step a), either between or on the at least one of the continuous fiber strands, the continuous woven fiber webs, the knit webs and the nonwoven webs, then integrating the at least one discrete insert part into the preform batch and laminating the at least one discrete insert part into the continuous profile.

8. The method according to claim 7, further comprising the step of using at least one planar prepreg cut as the at least one discrete insert part.

9. The method according to claim 7, further comprising the step of using at least one of a woven fabric cut, a knitted fabric cut or a non-woven fabric cut as the at least one discrete insert part.

10. The method according to claim 7, further comprising the step of using a force-application component as the at least one discrete insert part.

11. A method for continuous production of profile components of fiber composite material with a forming chain system, the fiber composite material comprising a matrix material and an arrangement of reinforcing fibers, the method comprising the steps of:
    a) feeding at least one of continuous fiber strands, continuous woven fiber webs, knit webs and nonwoven webs;
    b) combining the at least one of the continuous fiber strands, the continuous woven fiber webs, the knit webs and the nonwoven webs into a continuous preform batch;
    c) bringing the preform batch into contact with a working run of the forming chain system between two rotary forming chains comprised of links guided in a sliding manner along sliding guides each having a curvature on a side facing the preform batch;

d) guiding the preform batch through the forming chain system by the working run of the forming chains and forming a continuous profile having a curvature by curing the matrix material;

e) ejecting the continuous profile from the forming chain system;

f) cutting the continuous profile to a desired length to form the profile component, and g) adjusting the curvature of the sliding guides by controlling cylinders attached to the sliding guides, wherein the at least one of the continuous fiber strands, the continuous woven fiber webs, the knit webs and the nonwoven webs are at least one of pre-impregnated with the matrix material and impregnated with the matrix material during one of the step a), step b) and step c).

12. The method according to claim 11, further comprising the step of contacting and guiding the preform batch, during step c), on the working run of the forming chains of the forming chain system.

13. The method according to claim 12, further comprising the step of, during the step c), pressing the forming chains and guide plates, which are disposed opposite one another with respect to a path of the preform batch, against one another by a preloading apparatus.

14. The method according to claim 11, further comprising the step of contacting and guiding the preform batch, during the step c), on at least one guide plate, the working run of the forming chains and the at least one guide plate encloses the preform batch on all longitudinal sides.

15. The method according to claim 14, further comprising the step of heating the working run of one or more of the forming chains and the at least one guide plate to accelerate the curing of the matrix material.

16. The method according to claim 14, further comprising the step of entraining, during step c), a flexible elastic band either between the preform batch and the forming chains or between the preform batch and the at least one guide plate.

17. The method according to claim 11, further comprising the step of positioning at least one discrete insert part, during step a), either between or on the at least one of the continuous fiber strands, the continuous woven fiber webs, the knit webs and the nonwoven webs, then integrating the at least one discrete insert part into the preform batch and laminating the at least one discrete insert part into the continuous profile.

18. The method according to claim 17, further comprising the step of using at least one planar prepreg cut as the at least one discrete insert part.

19. The method according to claim 17, further comprising the step of using at least one of a woven fabric cut, a knitted fabric cut or a non-woven fabric cut as the at least one discrete insert part.

20. The method according to claim 17, further comprising the step of using a force-application component as the at least one discrete insert part.

* * * * *